(12) United States Patent
Kang et al.

(10) Patent No.: US 12,112,529 B2
(45) Date of Patent: Oct. 8, 2024

(54) APPARATUS AND METHOD FOR SEGMENTING STEEL MICROSTRUCTURE PHASE

(71) Applicants: HYUNDAI MOTOR COMPANY, Seoul (KR); KIA CORPORATION, Seoul (KR)

(72) Inventors: Min Woo Kang, Incheon (KR); Soon Woo Kwon, Ansan-si (KR); Chung An Lee, Hwaseong-si (KR); Hyun Ki Kim, Suwon-si (KR); Seung Hyun Hong, Seoul (KR); Jun Yun Kang, Changwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 830 days.

(21) Appl. No.: 17/230,455

(22) Filed: Apr. 14, 2021

(65) Prior Publication Data
US 2021/0407094 A1    Dec. 30, 2021

(30) Foreign Application Priority Data
Jun. 30, 2020    (KR) .................. 10-2020-0080423

(51) Int. Cl.
*G06V 10/82*    (2022.01)
*G06F 18/2132*    (2023.01)
(Continued)

(52) U.S. Cl.
CPC .......... *G06V 10/82* (2022.01); *G06F 18/2132* (2023.01); *G06F 18/24* (2023.01);
(Continued)

(58) Field of Classification Search
CPC ........ G06N 20/00; G06N 20/10; G06N 20/20; G06N 3/02; G06N 3/04; G06N 3/044;
(Continued)

(56) References Cited

U.S. PATENT DOCUMENTS

2015/0065850 A1* 3/2015 Jia .................. G06T 7/0012
600/408
2019/0318467 A1 10/2019 Anifowose et al.
(Continued)

FOREIGN PATENT DOCUMENTS

| EP | 3831971 B1 * | 3/2023 | ........... B32B 15/012 |
| KR | 10-1926181 B1 | 12/2018 | |
| KR | 10-1969242 B1 | 4/2019 | |

OTHER PUBLICATIONS

Naik et al., Texture-Based Metallurgical Phase Identification in Structural Steels: A Supervised Machine Learning Approach, May 10, 2019, Metals 2019: Advances in Structural Steel Research, pp. 1-26. (Year: 2019).*

(Continued)

*Primary Examiner* — Shane D Woolwine
(74) *Attorney, Agent, or Firm* — MORGAN, LEWIS & BOCKIUS LLP (57) ABSTRACT

An apparatus and a method for segmenting a steel microstructure phase are provided. The apparatus includes a storage configured for storing a machine learning algorithm and a processing device that segments a microstructure phase using the machine learning algorithm. The processing device is configured to receive label data, to learn a machine learning model by use of the label data as learning data for the machine learning model, and to segment a phase of a steel microstructure image by use of the learned machine learning model.

17 Claims, 7 Drawing Sheets

(51) Int. Cl.
- *G06F 18/24* (2023.01)
- *G06N 3/044* (2023.01)
- *G06N 3/045* (2023.01)
- *G06N 3/048* (2023.01)
- *G06N 3/08* (2023.01)
- *G06N 3/082* (2023.01)
- *G06N 20/00* (2019.01)
- *G06T 3/60* (2024.01)
- *G06T 7/00* (2017.01)
- *G06T 7/11* (2017.01)
- *G06V 20/70* (2022.01)

(52) U.S. Cl.
CPC .............. *G06N 3/044* (2023.01); *G06N 3/045* (2023.01); *G06N 3/08* (2013.01); *G06N 3/082* (2013.01); *G06T 3/60* (2013.01); *G06T 7/0002* (2013.01); *G06T 7/0004* (2013.01); *G06T 7/11* (2017.01); *G06V 20/70* (2022.01); *G06N 3/048* (2023.01); *G06N 20/00* (2019.01); *G06T 2207/10056* (2013.01); *G06T 2207/20081* (2013.01); *G06T 2207/20084* (2013.01); *G06T 2207/30136* (2013.01); *G06T 2207/30168* (2013.01)

(58) Field of Classification Search
CPC .......... G06N 3/045; G06N 3/048; G06N 3/08; G06N 3/082; G06V 10/82; G06V 20/70; G06F 18/2132; G06F 18/24; G06T 3/60; G06T 7/0002; G06T 7/0004; G06T 7/11; G06T 2207/10056; G06T 2207/20081; G06T 2207/20084; G06T 2207/30136; G06T 2207/30168
See application file for complete search history.

(56) References Cited

U.S. PATENT DOCUMENTS

| | | | |
|---|---|---|---|
| 2021/0049756 A1* | 2/2021 | He | G06N 3/04 |
| 2021/0228276 A1* | 7/2021 | Giraldez | G09B 1/00 |

OTHER PUBLICATIONS

Azimi et al., Advanced Steel Microstructural Classifcation by Deep Learning Methods, Feb. 1, 2018, Nature: Scientific Reports, pp. 1-14. (Year: 2018).*

A. W. Wilson et al., "Determining phase vol. fraction in steels by electron backscattered diffraction", Scripta Materialia, 45 (2001) 1335-1340.

Jinghui Wu et al., "Image Quality Analysis: A New Method of Characterizing Microstructures", ISIJ International, vol. 45 (2005), No. 2, pp. 254-262.

Fan Zhang et al., "Phase Identification of Dual-Phase (DP980) Steels by Electron Backscatter Diffraction and Nanoindentation Techniques", Microsc. Microanal. 22, 99-107, 2016.

* cited by examiner

APPARATUS AND METHOD FOR SEGMENTING STEEL MICROSTRUCTURE PHASE

CROSS-REFERENCE TO RELATED APPLICATION

The present application claims priority to Korean Patent Application No. 10-2020-0080423, filed on Jun. 30, 2020, the entire contents of which is incorporated herein for all purposes by this reference.

BACKGROUND OF THE INVENTION

Field of the Invention

The present invention relates to an apparatus and a method for segmenting a steel microstructure phase.

Description of Related Art

There has been a growing trend to apply a third generation steel to reduce the burden of cost of a component manufactured by a hot stamping method. The third generation steel uses a transformation induced plasticity (TRIP) phenomenon to overcome low formability which is the shortcomings of the existing steel. To use the TRIP phenomenon, the steel has a multi-phase microstructure composed of ferrite, bainite, martensite, and austenite. Because the microstructure of a material is closely related to formability and collision performance, it is needed to accurately segment a phase and quantitatively analyze the phase.

Thus, an existing technology uses an electron back scatter diffraction (EBSD) phase segmentation technique. Such a phase segmentation technique generates specific data of an EBSD measurement region as a histogram and 1-D spectroscopy data and segments an interval for each phase. The discriminant phase segmentation method such as the EBSD shows excellent efficiency in quantitative phase analysis for a plurality of multi-phase steel, particularly a third generation advanced high strength steel (AHSS), but has the following two problems. First, a user may directly determine a reference value of a phase discriminant from a microstructure image and a distribution map. Lastly, the provided phase discriminant does not have a sufficient relative ratio.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for segmenting a steel microstructure phase to segment a microstructure phase of steel using machine learning.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus of segmenting a steel microstructure phase may include a storage configured for storing a machine learning algorithm and a processing device that segments a microstructure phase using the machine learning algorithm. The processing device may receive label data, may learn a machine learning model by use of the label data as learning data for the machine learning model, and may segment a phase of a steel microstructure image by use of the learned machine learning model.

The label data may be a separate grain image for each phase segmented by a discriminant phase segmentation algorithm.

The discriminant phase segmentation algorithm may perform convolution calculation of image quality (IQ) and kernel average misorientation (KAM).

The label data may include information related to a grain to be segmented and information around the grain.

The information around the grain may be masked to be distinguished from the information about the grain.

An IQ value of the label data may be normalized to remove a difference in phase shading.

The processing device may randomly perform reverse and inverse reflection of the label data and may use the reflected data as the learning data.

The processing device may rotate the label data at a predetermined angle and may use the rotated label data as the learning data.

According to various aspects of the present invention, a method for segmenting a steel microstructure phase may include obtaining label data, learning a machine learning model by use of the label data as learning data, and segmenting a phase of a steel microstructure image using the learned machine learning model.

The obtaining of the label data may include obtaining a separate grain image segmented for each phase using a discriminant phase segmentation algorithm.

The separate grain image may include information related to a grain to be segmented and information around the grain.

The obtaining of the label data may further include masking the information around the grain to be distinguished from the information about the grain.

The obtaining of the label data may further include normalizing an IQ value of the label data to remove a difference in phase shading.

The obtaining of the label data may further include randomly performing reverse and inverse reflection of the label data and adding the reflected data as the learning data.

The obtaining of the label data may further include rotating the label data at any angle and adding the rotated label data as the learning data.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
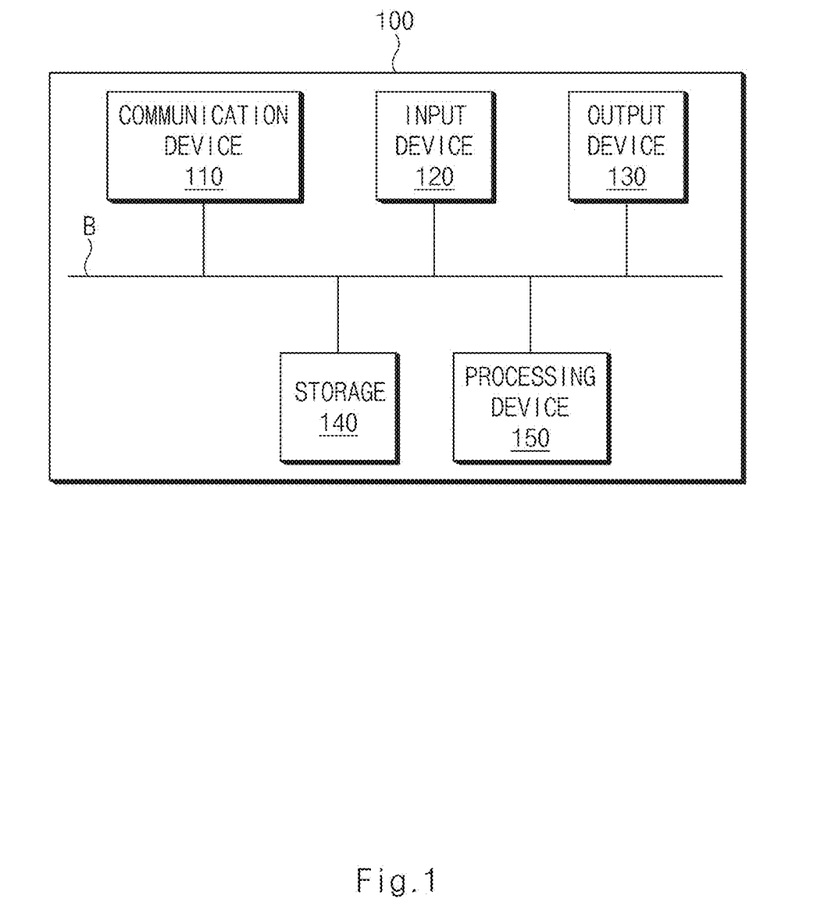
FIG. 1 is a block diagram illustrating a configuration of an apparatus of segmenting a steel microstructure phase according to various exemplary embodiments of the present invention.

FIG. 1 is a block diagram illustrating a configuration of an apparatus of segmenting a steel microstructure phase according to various exemplary embodiments of the present invention.

Referring to FIG. 1, an apparatus 100 for segmenting a steel microstructure phase (hereinafter, referred to as "apparatus 100") may include a communication device 110, an input device 120, an output device 130, a storage 140, and a processing device 150.

The communication device 110 may allow the apparatus 100 to communicate with an external device. In other words, the apparatus 100 may transmit and receive data with the external device using the communication device 110. The external device may be an electronic device configured for performing communication, which may be a laptop computer, a desktop computer, a portable terminal, a server, an imaging instrument, and/or the like. Herein, a scanning electron microscopy (SEM), a light optical microscopy (LOM), or the like may be used as the imaging instrument.

The communication device 110 may directly transmit data, received from the outside, to the processing device 150 or may transmit the data to the processing device 150 via the input device 120. The communication device 110 may use a communication technology such as a local area network (LAN), a wide area network (WAN), Ethernet, a wireless LAN (WLAN) (Wi-Fi), wireless broadband (Wibro), Worldwide Interoperability for Microwave Access (WiMAX), Bluetooth, near field communication (NFC), high speed downlink packet access (HSDPA), code division multiple access (CDMA), global system for mobile communication (GSM), long term evolution (LTE), LTE-advanced (LTE-A), and/or international mobile telecommunication-2020 (IMT-2000). The communication device 110 may include at least one of communication circuits.

The input device 120 may receive label data (or ground truth data) from the communication device 110 or the external device. The label data (or the ground truth data) may be data in which a label (attributes of learning data) is specified, which may be learning data used for supervised learning.

The input device 120 may process the label data (or the ground truth data) and may transmit the processed label data (or the processed ground truth data) to the processing device 150. In other words, the input device 120 may pre-process the label data (or the ground truth data) in a form of data configured for being processed by the processing device 150 and may transmit the pre-processed data to the processing device 150.

Furthermore, the input device 120 may include a user input device which generates input data depending on an operation of a user. The user input device may include a keyboard, a keypad, a touch pad, a touch screen, a mouse, a bar code reader, a quick response (QR) code scanner, a joystick, and/or the like.

The output device 130 may output a progress state and a result according to the operation of the processing device 150. Furthermore, the output device 130 may output a user interface (UI) or a graphic user interface (GUI). The output device 130 may include at least one of display devices such as a liquid crystal display (LCD), a thin film transistor-liquid crystal display (TFT LCD), an organic light-emitting diode (OLED) display, a flexible display, a three-dimensional (3D) display, a transparent display, a head-up display (HUD), and a touch screen.

The storage 140 may store instructions executed by the processing device 150. The storage 140 may temporarily store input/output data of the processing device 150. The storage 140 may store a machine learning algorithm (a machine learning model), learning data, label data, and/or the like. Furthermore, the storage 140 may store data generated in a machine learning process, the result of segmenting a steel microstructure phase by the machine learning model, and/or the like.

The storage 140 may be installed inside and/or outside the processing device 150. The storage 140 may be implemented as at least one of storage media such as a flash memory, a hard disk, a secure digital (SD) card, a random access memory (RAM), a read only memory (ROM), a programmable ROM (PROM), an erasable and programmable ROM (EPROM), an electrically erasable and programmable ROM (EEPROM), a register, a removable disc, and a web storage.

The processing device 150 may control the overall operation of the apparatus 100. The processing device 150 may include at least one of an application specific integrated circuit (ASIC), a digital signal processor (DSP), programmable logic devices (PLD), field programmable gate arrays (FPGAs), a central processing unit (CPU), microcontrollers, or microprocessors.

The processing device 150 may receive a label data set through the communication device 110 or the input device 120 and may pre-process the received label data set to use the received label data set as learning data. The label data set may be a set of label data extracted by a discriminant phase segmentation technique (a discriminant phase segmentation algorithm). The label data may be a separate grain image of each phase, for example, ferrite and bainite (an image for each grain). The separate grain image may be a square image using an image quality (IQ) map, which may include an adjacent region (information) around a separate grain. Accordingly, because the unit grain image includes the information about the separate grain, a phase recognition rate may be improved using a situation around a target grain in phase segmentation.

The processing device 150 may mask a peripheral region to separate a grain region to be segmented from a surrounding background. A grain region of interest in the label data, that is, the unit grain image (the separate grain image), and the surrounding background may be segmented by such masking processing. The processing unit 150 may normalize an IQ value of the label data to remove a difference in shading according to a phase. By removing the difference in phase shading, only a separate grain and a shape around the separate grain may be considered upon phase segmentation.

The processing device 150 may randomly perform reverse and inverse reflection of the label data and may rotate the label data at an angle between 0° to 360° to use the reflected and rotated data as learning data. Because the reflection of the label data reduces the influence of a direction where a test piece is measured, a phase segmentation recognition rate may be improved.

The processing device 150 may learn a machine learning model using the pre-processed label data for each phase. A convolution neural network (CNN) may be used as the machine learning model. The processing device 150 may output the result of segmenting measurement data into a ferrite region and a bainite region using the machine learning model. The CNN may be a neural network model simulating the operating principle of the visual cortex of the cerebrum of an animal, which may show excellent performance in image recognition. In the exemplary embodiment, the structure of AlexNet which is a deep neural network model in the CNN may be adopted. The AlexNet may extract features of an input image while the input image composed of three channels of red-green-blue (RGB) passes through convolution layers of the model and may segment the input image into one entity based on the extracted features. The AlexNet may decrease to a certain degree in recognition rate as compared to deep neural networks having a much greater number of hidden layers, which have been developed recently, but may have a smaller number of parameters and a quicker running speed based on its simple structure than the deep neural networks.

The processing device 150 may learn a machine learning model using a transfer learning scheme. An existing fully-connected layer located on a terminal of the machine learning model (the CNN model) may be replaced with a layer for segmenting only two entities, such as ferrite and bainite, by transfer learning, and a learn rate of 10 times compared to the previous layer may be assigned to the layer. The processing device 150 may perform primary learning for the machine learning model using some (85%) of the label data for each phase. When the primary learning is completed, the processing device 150 may return a learn rate of a terminal layer of the machine learning model to be the same as an existing layer. The processing device 150 may perform secondary learning for the machine learning model using the other data except for the some data used for the primary learning among the label data for each phase to optimize the model. The optimized machine learning model, that is, the machine learning model, the learning of which is completed, may be composed of a total of 25 hidden layers, such as a convolution 2D layer, a rectified linear Unit (ReLU) layer, a cross channel normalization layer, a max pooling 2D layer, a fully connected layer, a drop out layer, and a softmax layer.

The processing device 150 may segment a phase in a microstructure image using the machine learning model, the learning of which is completed, that is, a phase segmentation model. In other words, when the microstructure image is input to the machine-learned phase segmentation model (algorithm), a phase segmentation model may segment a phase in the microstructure image and may output the segmented result on an output device (e.g., a display). Herein, the microstructure image may be obtained by an imaging instrument such as an SEM or an LOM.

Figure 2:
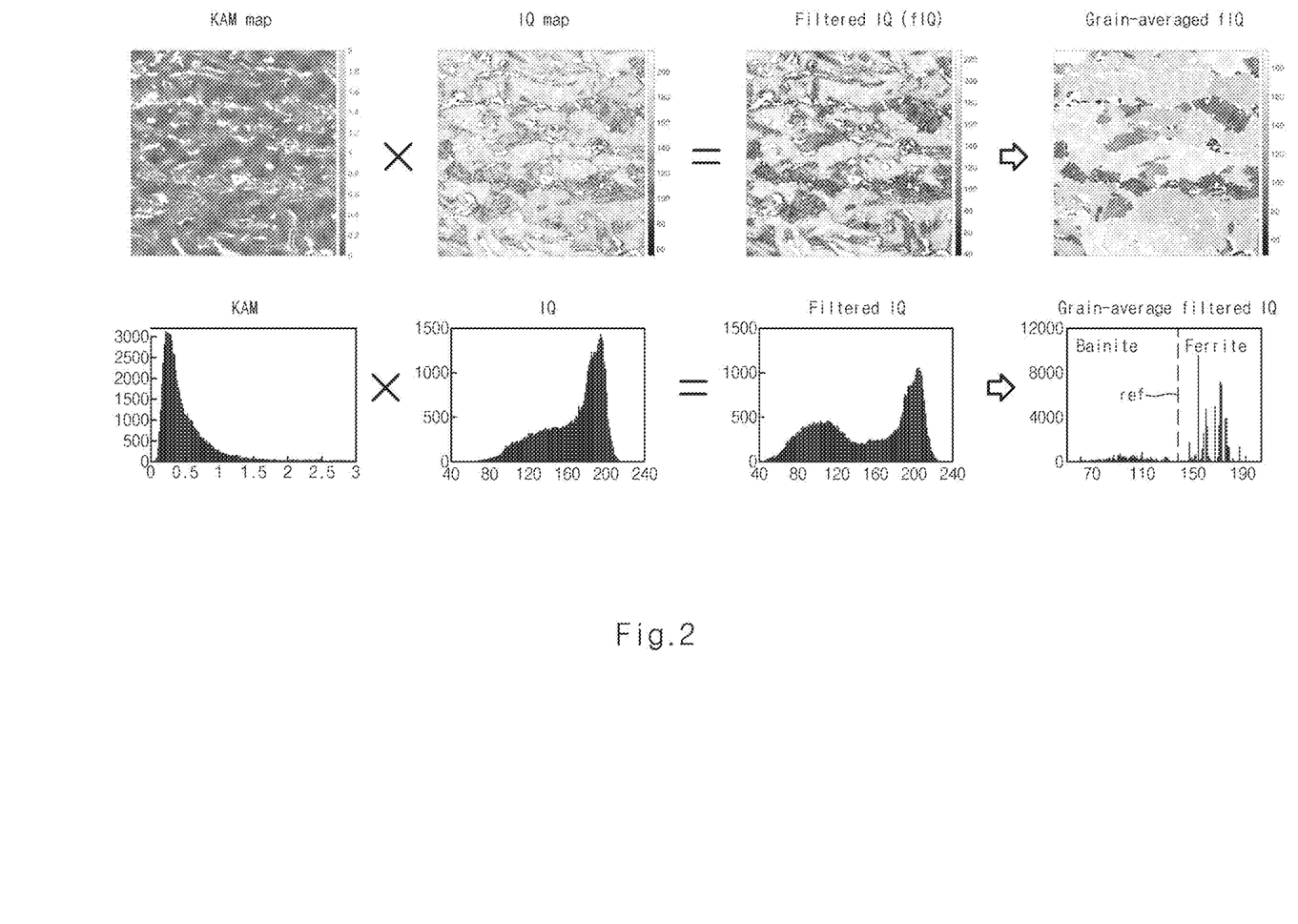
FIG. 2, FIG. 3, and FIG. 4 are drawings illustrating label data extraction using a discriminant phase segmentation algorithm according to various exemplary embodiments of the present invention.
Figure 3:
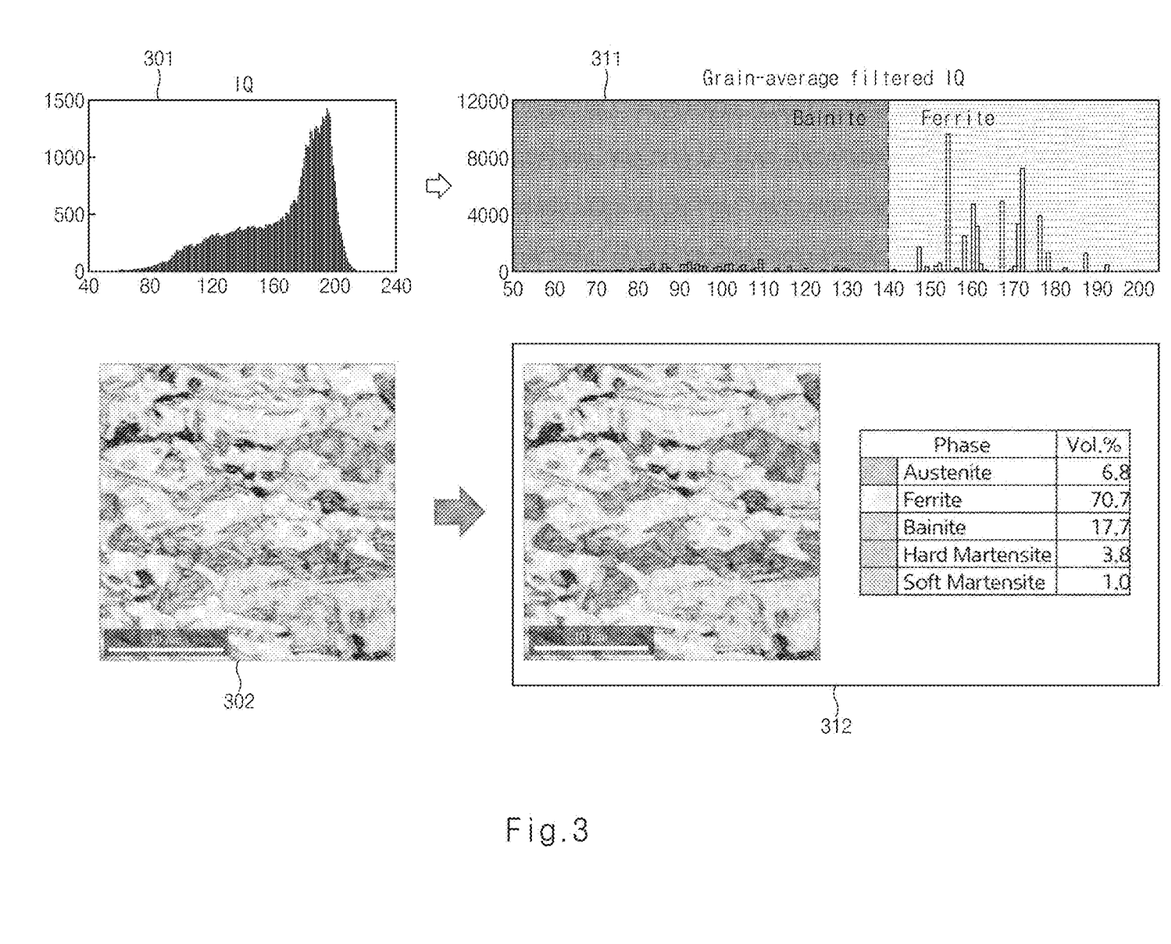
Figure 4:
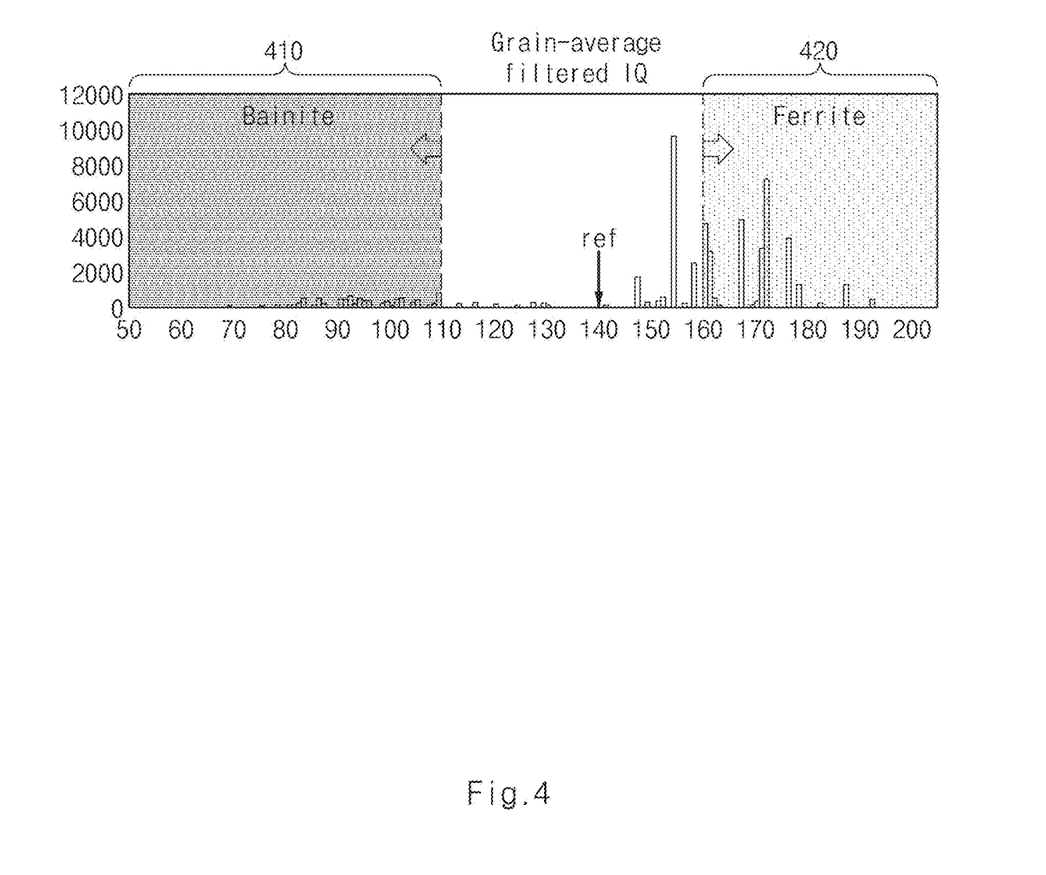

FIG. 2, FIG. 3 and FIG. 4 are drawings illustrating label data extraction using a discriminant phase segmentation algorithm according to various exemplary embodiments of the present invention.

Because it is difficult to segment ferrite and bainite using only IQ, a discriminant phase segmentation algorithm may make up a phase discriminant by use of kernel average misorientation (KAM) at the same time. Referring to FIG. 2, a discriminant phase segmentation algorithm may perform convolution of an IQ map and a KAM map. In other words, the discriminant phase segmentation algorithm may perform convolution calculation by applying a mask formed with the KAM map to the IQ map, thus obtaining the IQ map filtered by the KAM mask, that is, filtered IQ (fIQ). The discriminant phase segmentation algorithm may convert the fIQ into a grain-averaged fIQ distribution to remove a region where ferrite and bainite are overlapped with each other, thus easily separating ferrite from bainite. A segmentation numerical value ref, which becomes a phase segmentation criterion of segmenting a ferrite phase and a bainite phase when the fIQ is used, may be provided, and it is possible to quantify phase fraction. For example, as shown in FIG. 3, when an IQ distribution 301 and an IQ map 302 extracted from raw data are input, the discriminant phase segmentation algorithm may output phase segmentation results 311 and 312.

Label data to be used as learning data may be extracted based on the phase segmentation results by the discriminant phase segmentation algorithm. At this time, as shown in FIG. 4, only grains 410 and 420, each of which has a predetermined difference value from a reference value, that is, a segmentation numerical value ref, may be used.

Figure 5:
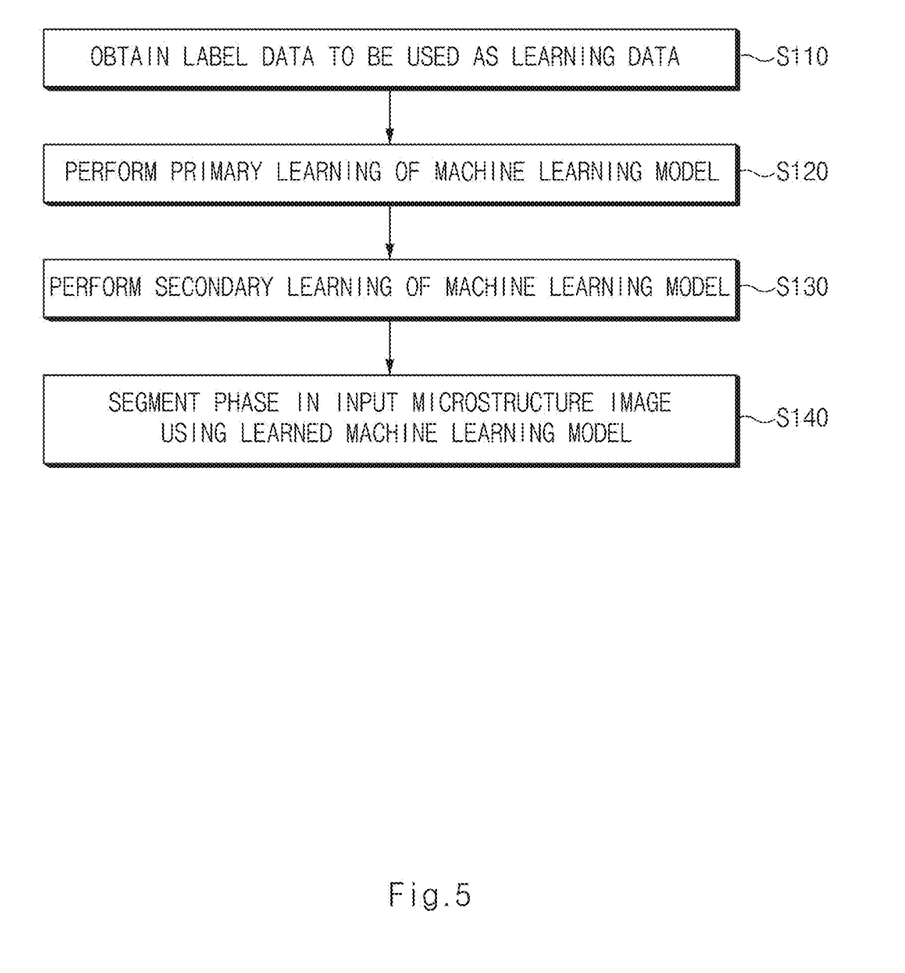
FIG. 5 is a flowchart illustrating a method for segmenting a steel microstructure phase according to various exemplary embodiments of the present invention.
Figure 6:
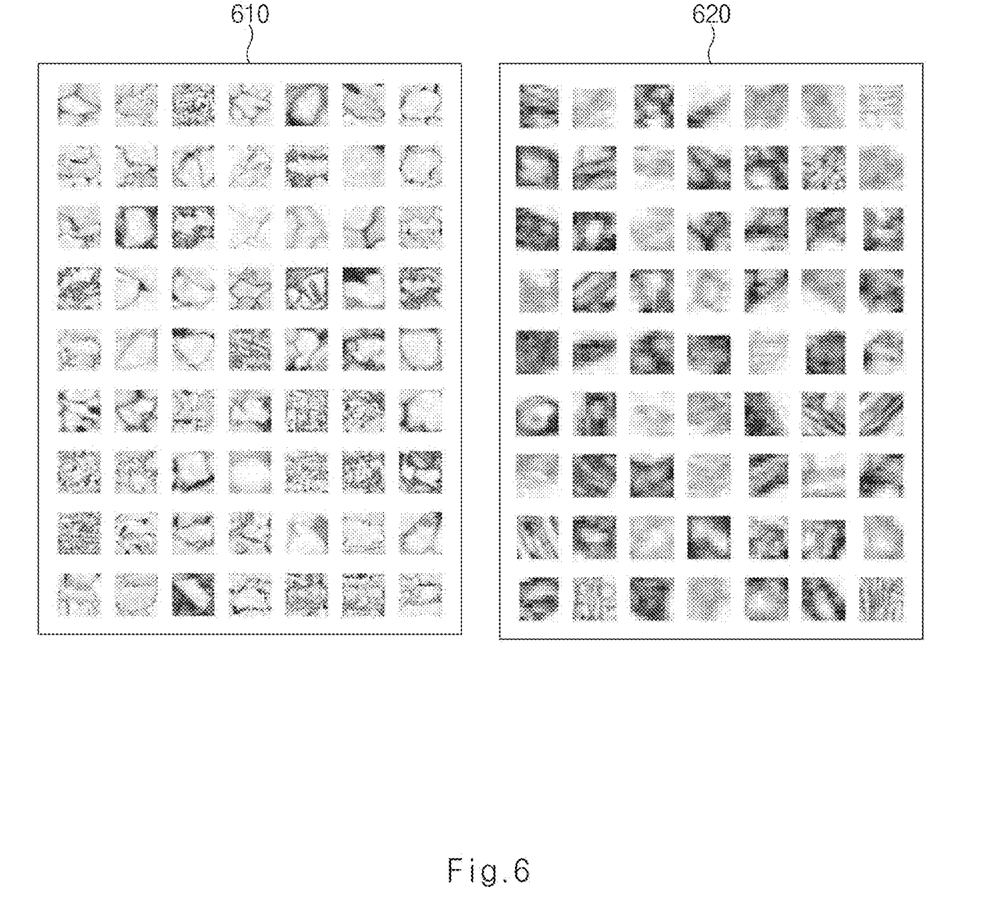
FIG. 6 is a drawing illustrating label data for each phase according to various exemplary embodiments of the present invention.

FIG. 5 is a flowchart illustrating a method for segmenting a steel microstructure phase according to various exemplary embodiments of the present invention. FIG. 6 is a drawing illustrating label data for each phase according to various exemplary embodiments of the present invention.

Referring to FIG. 5, in S110, a processing device 150 of FIG. 1 may receive label data as learning data. The processing device 150 may receive label data via a communication device 110 or an input device 120 of FIG. 1. The processing device 150 may pre-process the label data to use the label data as the learning data. The processing device 150 may use a separate grain image obtained through electron back scatter diffraction (EBSD). The processing device 150 may segment a phase of the separate grain image using a discriminant phase segmentation algorithm to generate label data. The discriminant phase segmentation algorithm may generate label data using a phase discriminant fIQ of a grain, which is formed by convolution of IQ and KAM. The processing device 150 may provide a label data set as learning data, using only grains, each of which has a value sufficiently far away from a segmentation reference value among a plurality of label data. As shown in FIG. 6, the learning data may include a label data set for each phase, for example, a ferrite label data set 610 and a bainite label data set 620. Some (85%) of the label data for each phase may be used for primary learning, and the other data (e.g., 15%) may be used to validate an optimization process through secondary learning.

In S120, the processing device 150 may perform primary learning for a machine learning model by use of the learning data. The processing device 150 may learn the machine learning model using some of the learning data. A CNN model may be used as the machine learning model.

When the primary learning is completed, in S130, the processing device 150 may perform secondary learning for the machine learning model. The processing device 150 may perform secondary learning using the other data except for the some data used for the primary data among the learning data to optimize the machine learning model. The processing device 150 may optimize a parameter of the machine learning model (a machine learning algorithm), the primary learning of which is performed, to generate a phase segmentation model (a phase segmentation algorithm).

In S140, the processing device 150 may segment a phase in an input microstructure image using the machine learning model learned through the secondary learning. When a steel microstructure image obtained by an imaging instrument is input, the processing device 150 may segment (divide) a phase of the steel microstructure image using the learned machine learning model, that is, a phase segmentation model based on machine learning, and may output a phase fraction as a result of the segmentation.

Figure 7:
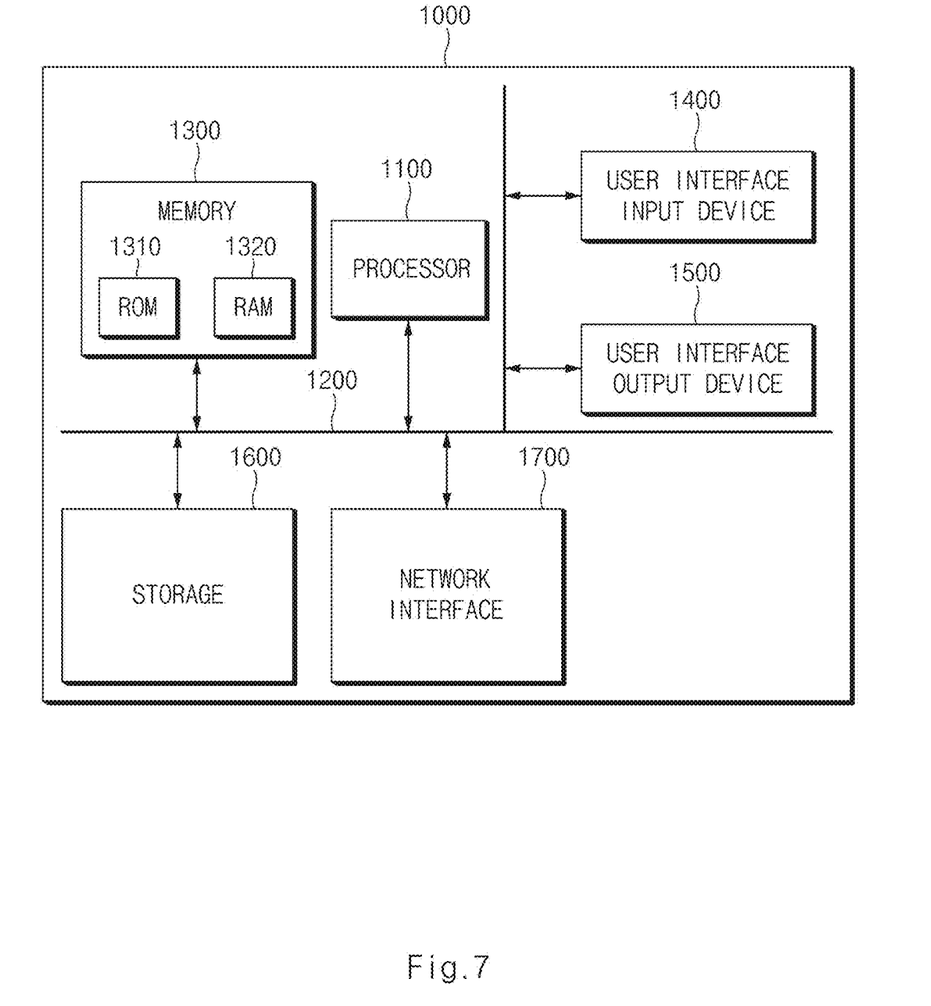
FIG. 7 is a block diagram illustrating a computing system for executing a method for segmenting a steel microstructure phase according to various exemplary embodiments of the present invention.

FIG. 7 is a block diagram illustrating a computing system for executing a method for segmenting a steel microstructure phase according to various exemplary embodiments of the present invention.

Referring to FIG. 7, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments included herein may be embodied directly in hardware or a software module executed by the processor 1100, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to exemplary embodiments of the present invention, a machine learning model may be learned using image information for each grain segmented in a discriminant phase segmentation technique and a microstructure phase of the steel may be segmented (divided) using the learned machine learning model. Thus, it is unnecessary for a user to intervene. It may be flexibly applied to various steel types. Consistency of analysis may be maintained.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for segmenting a steel microstructure phase, the apparatus comprising:
   a storage configured for storing a machine learning algorithm; and
   a processing device configured for segmenting the steel microstructure phase by use of the machine learning algorithm,
   wherein the processing device is configured to:
   receive label data through an input device;
   learn a machine learning model by use of the label data as learning data for the machine learning model;
   segment a phase of a steel microstructure image by use of the learned machine learning model; and
   output the segmented result on an output device, and
   wherein an image quality (IQ) value of the label data is normalized to remove a difference in phase shading.

2. The apparatus of claim 1, wherein the label data is a separate grain image for each phase segmented by a discriminant phase segmentation algorithm.

3. The apparatus of claim 2, wherein the discriminant phase segmentation algorithm is configured to perform convolution calculation of the IQ and kernel average misorientation (KAM).

4. The apparatus of claim 2, wherein the processing device is configured to randomly perform reverse and inverse reflection of the label data and to use the reversely and inversely reflected label data as the learning data.

5. The apparatus of claim 2, wherein the label data includes information related to a grain to be segmented and information around the grain.

6. The apparatus of claim 5, wherein the information around the grain is masked by the processing device to separate the information related to the grain from the information around the grain.

7. The apparatus of claim 4, wherein the processing device is configured to rotate the label data at a predetermined angle between 0° to 360° and to use the rotated label data as the learning data.

8. The apparatus of claim 1, wherein the learning of the machine learning model includes:
primary learning for the machine learning model by use of a predetermined amount of the learning data; and
when the primary learning is completed, performing secondary learning for the machine learning model by use of another data except for the predetermined amount of data used for the primary learning among the learning data so as to optimize the machine learning model.

9. A method for segmenting a steel microstructure phase, the method comprising:
obtaining, by a processing device, label data through an input device;
learning, by the processing device, a machine learning model by use of the label data as learning data for the machine learning model;
segmenting, by the processing device, a phase of a steel microstructure image by use of the learned machine learning model; and
outputting, by the processing device, the segmented result on an output device,
wherein the obtaining of the label data further includes:
normalizing an image quality (IQ) value of the label data to remove a difference in phase shading.

10. The method of claim 9, wherein the learning of the machine learning model includes:
primary learning for the machine learning model by use of a predetermined amount of the learning data; and
when the primary learning is completed, performing secondary learning for the machine learning model by use of another data except for the predetermined amount of data used for the primary learning among the learning data so as to optimize the machine learning model.

11. The method of claim 9, wherein the obtaining of the label data includes:
obtaining a separate grain image segmented for each phase using a discriminant phase segmentation algorithm.

12. The method of claim 11, wherein the discriminant phase segmentation algorithm is configured to perform convolution calculation of image quality (IQ) and kernel average misorientation (KAM).

13. The method of claim 11, wherein the separate grain image includes information related to a grain to be segmented and information around the grain.

14. The method of claim 13, wherein the obtaining of the label data further includes:
masking, by the processing device, the information around the grain to separate the information related to the grain from the information around the grain.

15. The method of claim 13, wherein the obtaining of the label data further includes:
randomly performing, by the processing device, reverse and inverse reflection of the label data and adding, by the processing device, the reversely and inversely reflected data as the learning data.

16. The method of claim 13, wherein the obtaining of the label data further includes:
rotating, by the processing device, the label data at a predetermined angle between 0° to 360° and adding, by the processing device, the rotated label data as the learning data.

17. A non-transitory computer readable storage medium on which a program for performing the method of claim 9 is recorded.

* * * * *